J. V. MOORE

MECHANISM AND METHOD FOR PRODUCING ELASTIC FABRIC

Jan. 20, 1931. Original Filed March 1, 1929 Re. 17,934

INVENTOR.
John V. Moore
BY
Vandegrift Gray & Hawley
ATTORNEYS.

Reissued Jan. 20, 1931 Re. 17,934

UNITED STATES PATENT OFFICE

JOHN V. MOORE, OF PAWTUCKET, RHODE ISLAND, ASSIGNOR TO MOORE FABRIC COMPANY, OF PAWTUCKET, RHODE ISLAND, A CORPORATION OF RHODE ISLAND

MECHANISM AND METHOD FOR PRODUCING ELASTIC FABRICS

Original application filed March 1, 1929, Serial No. 343,662. Divided and application filed March 25, 1930, Serial No. 438,785. Original No. 1,772,957, dated August 12, 1930. Application for reissue filed November 29, 1930. Serial No. 499,115.

This is a division of my application, Serial No. 343,662, filed by me March 1, 1929.

This invention relates to the production of curvilinear elastic fabric and more particularly to the production of relatively narrow elastic fabric, adapted for use in sanitary belts, garters and other similar articles.

It is the object of my invention to provide an improved mechanism for producing such curvilinear elastic fabric, together with an improved method of operation thereof.

My invention further relates to arrangements and combinations of parts which will be hereinafter described and more particularly pointed out in the appended claims.

Figure 1:
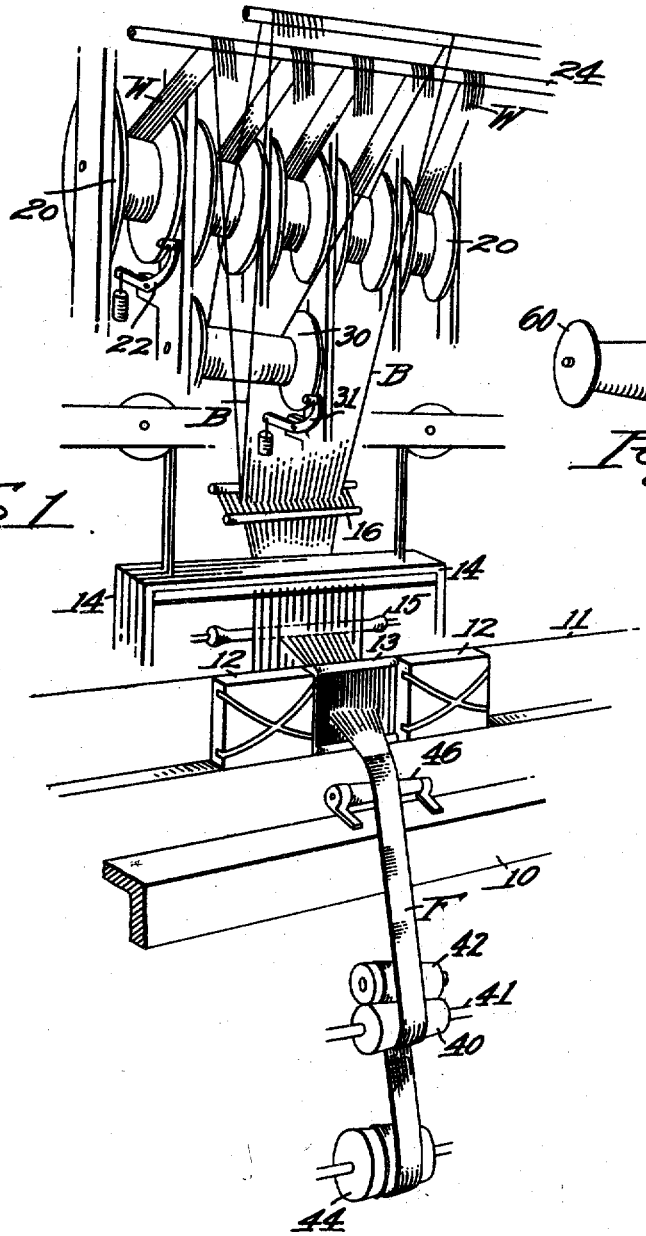
Figure 2:
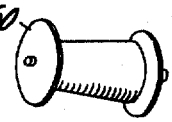

A preferred form of mechanism for carrying out my invention is shown in the drawings in which Fig. 1 is a perspective view of portions of a narrow fabric loom; and Fig. 2 is a perspective view of a modified warp beam.

Referring to the drawings, I have shown portions of a narrow fabric loom including a breast beam 10, a lay 11 having guiding blocks 12 in which the usual shuttles are reciprocated, a reed 13, a plurality of harnesses 14, a warp guide-roll 15 at the rear of the harnesses, and an assembly reed 16, preferably mounted above the guide-roll 15. The reed 13 is preferably graduated with the dents more closely together toward the left hand end of the reed, as viewed in the drawing.

Groups of elastic warp threads W are wound on sectional warp beams 20, mounted for independent rotation and separately tensioned by friction devices 22, of which one only is shown. It will be understood, however, that one such device is provided for each warp beam 20.

The warps W pass from the beams 20 over an elevated guide-bar 24 and thence to the assembly reed 16. Binder warps B are wound on a single cylindrical warp beam 30 mounted for separate rotation and separately tensioned by a friction device 31.

The woven fabric F passes over the breast beam 10 to a conical take-up roll 40, mounted on a shaft 41 and positively driven. A guide-roll 42 increases the lap of the fabric F on the take-up roll 40 and the fabric passes from the roll 42 to a conical cloth roll 44. A conical guide-roll 46 may be provided on the breast beam 10.

The method of production of curvilinear elastic fabric by use of the mechanism described is as follows:

The woven fabric is drawn downward by the conical take-up roll 40, but the non-elastic binder warp threads B are supplied from the cylinder warp beam 30. The joint effect is to tension the binder warps increasing towards the large end of the take-up roll 40, leaving the binder warps toward the smaller end relatively slack.

The elastic warp threads W are woven under relatively heavy but substantially uniform tension, which tension is maintained uniform during the weaving, as the warp beams are mounted to rotate independently and will let off a greater length of warp toward the side of the fabric corresponding to the larger end of the take-up roll 40.

The more tightly the binder warps are tensioned, the more firmly they bind the elastic warps. The more tightly the elastic warps are bound into the fabric, the less they are able to contract when the fabric is released from the weaving tension.

Consequently the edge of the fabric where the binder warps are under greater tension and more tightly woven will be longer upon release than the edge of the fabric where the binder warps are relatively slack tensioned. The fabric will thus assume a curvilinear shape, with the long edge of the fabric towards the larger end of the take-up roll 40.

The results thus far described could be attained with a reed of uniform spacing, but the curvilinear effect is increased by use of the graduated reed 13, which crowds the warp threads more closely together at the long edge of the fabric, thus increasing the close binding of the elastic warps and still further reducing the relative contraction thereof at the long edge.

If still further curvature is desired, a slightly tapered warp beam 60 (Fig. 2) may be substituted for the straight warp beam 30 shown in Fig. 1. If the larger end of the warp beam 60 is placed at the right, or toward the short edge of the woven fabric, the slackness of the binder warps on the short edge will be accentuated and a sharper curvature will be secured.

Having thus described my invention and the advantages thereof, I do not wish to be limited to the details herein disclosed, otherwise than as set forth in the claims, but what I claim is:—

1. Mechanism for producing a piece of curvilinear elastic fabric comprising a plurality of sectional warp beams supplying elastic warp threads to separate adjacent parallel portions of said piece of fabric, said warp beams being independently rotatable and separately retarded, a conical take-up mechanism for the woven fabric by which one edge of said woven fabric is taken up faster and is longer than the other edge portion, and storage means from which non-elastic binder warps are drawn, said storage and take-up means cooperating to provide a relatively greater length of non-elastic binder warps per unit of edge length of woven fabric at the short edge of said fabric and a relatively less length at the long edge.

2. Mechanism for producing a piece of curvilinear elastic fabric comprising a plurality of sectional warp beams supplying elastic warp threads to separate adjacent parallel portions of said piece of fabric, said warp beams being independently rotatable and separately retarded, a single warp beam supplying non-elastic binder warps to the full width of said piece of fabric, weaving mechanism and take-up means including a conical roll for taking up the woven fabric, said single warp beam being of no greater diameter at the large end of said conical take-up roll than is the opposite end of said warp beam, whereby proportionately less binder warp relative to the periphery of the take-up roll is supplied at the larger end of said take-up roll.

3. Mechanism for producing a piece of curvilinear elastic fabric comprising a plurality of sectional warp beams supplying elastic warp threads to separate adjacent parallel portions of said piece of fabric, means to separately but uniformly retard the rotation of said beam sections, a single cylindrical warp beam supplying non-elastic binder warps to the full width of said piece of fabric, means to retard the rotation of said single beam, weaving mechanism, and a conical take-up roll effective to take-up the woven fabric at a rate gradually increasing from one edge to the other thereof.

4. Mechanism for producing a piece of curvilinear elastic fabric comprising means to supply a plurality of rubber warp threads under substantially uniform tension, means to take-up the woven fabric at a rate increasing from one edge to the other of the woven fabric, and means to supply a proportionately greater length of non-elastic binder warp per unit of edge length of woven fabric at the shorter edge of said fabric.

5. Mechanism for producing a piece of curvilinear elastic fabric comprising means to supply a plurality of rubber warp threads under substantially uniform tension, means to take-up the woven fabric at a rate, increasing from one edge to the other of the woven fabric, and storage means effective to feed binder warp as fast to the edge portion of the fabric which is taken up more slowly as to the edge portion which is taken up more rapidly.

6. The method of weaving curvilinear elastic fabric which consists in supplying rubber warp threads under substantially uniform tension, supplying non-elastic warp threads at a uniform rate of feed throughout the width of the fabric, inserting weft, and taking up the woven fabric faster at one edge than at the other, greater shrinkage of the rubber warp threads occurring at the short edge of the fabric.

In testimony whereof I have hereunto affixed my signature.

JOHN V. MOORE.